May 24, 1932.    G. TANZI    1,859,416

MEANS FOR MANUFACTURING MACARONI

Filed Nov. 1, 1929

INVENTOR
GUIDO TANZI

BY Ezekiel Wolf.
ATTORNEY

Patented May 24, 1932

1,859,416

UNITED STATES PATENT OFFICE

GUIDO TANZI, OF BROOKLYN, NEW YORK, ASSIGNOR TO MARIO TANZI & BROS., INC., OF BOSTON, MASSACHUSETTS, A CORPORATION OF MASSACHUSETTS

MEANS FOR MANUFACTURING MACARONI

Application filed November 1, 1929. Serial No. 404,025.

The present invention relates to dies, and more particularly to dies to manufacture certain types of macaroni, more particularly to fusilli dies, which is a fine type of macaroni made in spiral form.

In the prior method of producing this type of macaroni, the macaroni was first produced straight and then curled upon tubes to produce the spiral effect. This was a hand operation, and necessarily needed additional labour in manufacturing as well as a longer period to manufacture. I overcame this difficulty by inventing a die by which the fusilli macaroni could be manufactured in one operation in the same manner as the ordinary macaroni. This invention is shown in my Patent Number 1,506,869, of September 2, 1924, and has practically caused revolutionized methods in the manufacture of fusilli macaroni.

The present invention is an improvement upon the invention of the Patent 1,506,869.

In the apparatus as formerly made, the dough was forced through a number of openings arranged concentrically about a plate which was provided with an annular trough or cupped in the center. The openings were substantially normal to the cupping surface or trough surface and passed at an angle to the bottom surface of the plate out through that surface. In this mechanism the plate, the plug, and the pin all required considerable labor in construction. The plate besides being grooved or cupped had to be shaped to meet the particular construction of the plug and had to have a crescent shaped recess where the dough was to emerge.

In this construction, the center cup serves as a reservoir for the dough and as a means of initially forcing the dough into the die openings.

In the present invention, I have improved this system by providing each die with an individual reservoir, as it were, through the construction of the plug itself. In this manner I am able to get a good many more dies into the plate for the same area, and therefore increase production. This will more fully appear later.

In addition to the plug construction has been simplified and improved and the product now turned out is superior to that formerly turned out by the old dies, although the old dies were a great improvement over the prior art.

Figure 1:
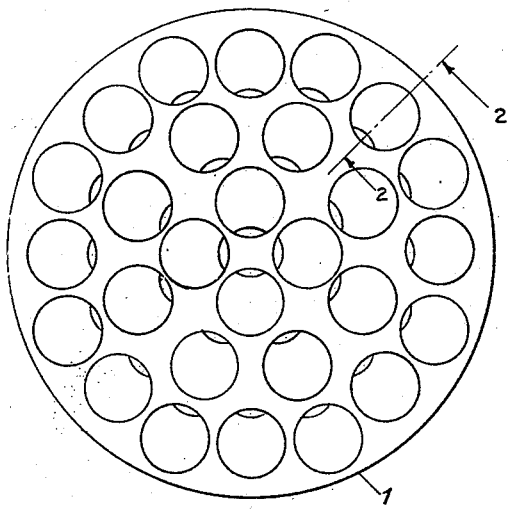
Figure 2:
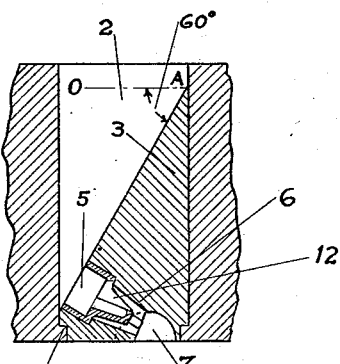
Figure 4:
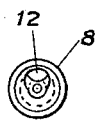
Figure 5:
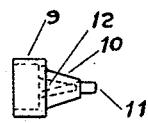
Figure 3:
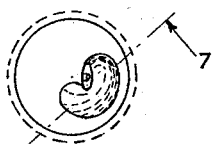
Figure 6:
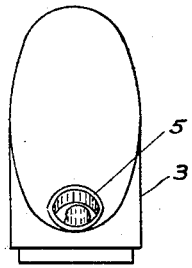

The present invention is more fully explained in the following description of an embodiment of the same taken in connection with the annexed drawings in which:

Figure 1 shows a plan view of the die plate.
Figure 2 shows a section on the line 2—2 of Figure 1.
Figure 3 shows an end view looking from the bottom up on the plug as shown in Figure 6.
Figure 4 shows a view of the pin shown in section in Figure 2.
Figure 5 shows a side view of the pin as shown in Figure 4.
Figure 6 shows a view of the plug inserted in the plate, and
Figure 7 shows a section on the line 7—7 of Figure 3, showing the end of the plug.

In Figure 1, 1 indicates the die plate which is perforated with holes 2, in which is inserted the plug 3. The holes 2 have small shoulders at 4 to prevent the plugs from going through the hole. In the die plate no special arrangement of the holes are necessary. They may be spaced to obtain the greatest number of plugs in the die plate.

Figure 7:
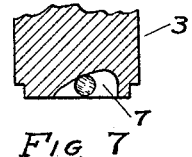

The plug itself is shown in Figures 2 to 7 inclusive. The plug is made of metal preferably brass and is substantially cylindrical in its body shape with the cylinder cut off obliquely making an angle with the horizontal of 60° as indicated by the line OA and the edge of the section of the plug shown in Figure 2. This section of the plug is substantially elliptical in shape as shown in Figure 6. At the lower end of the plug is an opening substantially normal to the surface of the section as shown in Figure 2 and extending through the plug to the lower face which is perpendicular to the axis of the cylindrical body of the plug. The opening is circular in the upper portion 5 with straight walls and slightly tapered in its lower portion towards the bottom face of the plug. The exit 7 at the bottom face of the plug is made into a spiral groove which is deeper at the opening and gradually becomes shallow at the bottom surface of the plug as shown in Figures 2, 3, and 7.

Within the opening is fitted the pin 8, shown in Figures 4 and 5. The pin comprises a cylindrical cup portion 9, a tapered cone portion 10, extending from the cup portion and a pin 11. The cone portion 10 is partly cut away by a straight cut forming an opening 12 shown in Figures 2, 4 and 5.

The pin is inserted in the opening 5 in such a manner that the pin 11 comes in the center of the outlet opening and so that the cut portion 12 of the pin is symmetrical with the deeper part of the spiral groove in the plug face.

The tapered portion 10 of the pin is somewhat smaller than the tapered portion 6 of the opening in the plug. This dimension must be carefully designed for it controls the curling of the macaroni to a great extent.

When the dough or paste is forced down through the opening 2 in the die plate and into the plug opening 5, it is somewhat retarded in part of its flow on account of the construction of the orifice, as it were, through which the paste or dough is forced. The operation differs from that of a liquid orifice in that there are stresses and torsion set up in the dough or paste which tend to cause it to react and change its shape accordingly.

The dough passing through the opening 5 is forced out of the pin through the opening 12 and then also fills up the space in between the wall 6 of the opening and 10 of the pin. The portion which fills up the space between 6 and 10 is however slower in motion on account of its smaller space and longer traveling distance than the portion moving directly out through the opening 12 into the cavity of the plug.

As the material emerges from the opening the motion on the side of the pin towards the smaller space between 6 and 10 is held back somewhat, while material on the less obstructed portion is forced out quicker and fills the deeper portion of the spiral groove 7. As in this section, there is more material available, this portion becomes the outer portions of the spirals, while the other part at the shallower end of the spiral becomes the inner portion.

In order to clear the opening which was a difficulty sometimes encountered in the other type used, the new material forcing the other material out gives it a twist on account of the spiral which twist accounts for the use of the extra material flowing more fully and freely from the opening.

The principle is somewhat difficult to explain, but nevertheless is well determined. The outer portions of the spiral need more material than the inner portions as their path is longer. By twisting the macaroni as it emerges the outer portion is kept relatively in its same position and a definite rate of flow established so that one part does not hinder, but cooperates with the other part.

The pin inserted in the plug rests securely therein and has no tendency to be dislodged because the paste is always forced down through it and not around it as in the old pins formerly used. The space between the wall of the pin and the wall of the opening, I have found to be very critical and by proper proportioning of this space with the area of the opening in the pin, I can control the correct feed, so that the macaroni will twist and by shaping properly the spiral groove to correspond with this, I can conduct the material away uniformly.

Having now described my invention, I claim:

1. Means for producing spiral macaroni, comprising a die having a uniform outlet and inlet opening and a compound passage therebetween for unbalancing the flow at said outlet opening and a spiral groove positioned opposite said outlet opening for twisting and carrying the macaroni free from said die.

2. Means for producing spiral macaroni, comprising a die having a substantially circular outlet opening with a pin located in the center thereof, a spiral grooved passage located near said opening and adapted to produce a spiral macaroni of a given pitch and diameter, and means positioned before said outlet and so proportioned to distribute the flow of material through said opening in the correct quantity and distribution to correspond to the pitch and diameter of the spiral to be produced.

GUIDO TANZI.